United States Patent
Zalmanovitch et al.

(10) Patent No.: US 9,887,894 B2
(45) Date of Patent: Feb. 6, 2018

(54) RECOMMENDATIONS FOR REDUCING DATA CONSUMPTION BASED ON DATA USAGE PROFILES

(71) Applicant: Microsoft Corporation, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 204 days.

(21) Appl. No.: 13/721,023

(22) Filed: Dec. 20, 2012

(65) Prior Publication Data

US 2013/0196615 A1    Aug. 1, 2013

Related U.S. Application Data

(60) Provisional application No. 61/696,472, filed on Sep. 4, 2012, provisional application No. 61/591,503, filed
(Continued)

(51) Int. Cl.
*H04M 11/00*    (2006.01)
*H04L 12/26*    (2006.01)
(Continued)

(52) U.S. Cl.
CPC ...... *H04L 43/0876* (2013.01); *H04L 12/1435* (2013.01); *H04L 43/045* (2013.01);
(Continued)

(58) Field of Classification Search
CPC ........... H04W 4/00; H04W 4/26; H04W 4/24; H04L 43/0876; H04L 12/1435;
(Continued)

(56) References Cited

U.S. PATENT DOCUMENTS 5,778,182 A    7/1998    Cathey et al.
6,308,328 B1    10/2001    Bowcutt et al.
(Continued)

FOREIGN PATENT DOCUMENTS

WO    2008/097105 A1    8/2008
WO    2008/155444 A1    12/2008
(Continued)

OTHER PUBLICATIONS

Blass, Evan, "Exclusive: Windows Phone 8 Detailed", Retrieved at <<http://pocketnow.com/windows-phone/exclusive-windows-phone-8-detailed>>, Feb. 2, 2012, pp. 2.
(Continued)

*Primary Examiner* — Timothy Pham

(57) ABSTRACT

Embodiments profile users based on data usage of installed applications and provide recommendations for reducing data usage. A computing device or cloud service determines a plurality of applications installed on the computing device. Data usage patterns associated with each of the determined plurality of applications are identified. The data usage patterns describe data usage over a network for at least one of the determined plurality of applications. One or more recommendations for reducing data usage are defined based on the identified data usage patterns. Some embodiments recommend switching applications, uninstalling applications, or disabling particular network connections.

20 Claims, 6 Drawing Sheets

Related U.S. Application Data on Jan. 27, 2012, provisional application No. 61/591,509, filed on Jan. 27, 2012.

(51) Int. Cl.
| | |
|---|---|
| *H04M 15/00* | (2006.01) |
| *H04L 12/14* | (2006.01) |
| *H04W 4/24* | (2009.01) |
| *H04W 4/00* | (2009.01) |
| *H04W 8/18* | (2009.01) |
| *H04M 1/725* | (2006.01) |
| *H04W 88/06* | (2009.01) |

(52) U.S. Cl.
CPC .......... *H04L 43/062* (2013.01); *H04M 15/41* (2013.01); *H04M 15/58* (2013.01); *H04M 15/60* (2013.01); *H04M 15/765* (2013.01); *H04M 15/7652* (2013.01); *H04M 15/80* (2013.01); *H04M 15/83* (2013.01); *H04M 15/84* (2013.01); *H04M 15/846* (2013.01); *H04M 15/85* (2013.01); *H04M 15/853* (2013.01); *H04M 15/854* (2013.01); *H04M 15/86* (2013.01); *H04W 4/003* (2013.01); *H04W 4/24* (2013.01); *H04W 8/186* (2013.01); *H04M 1/72522* (2013.01); *H04M 15/775* (2013.01); *H04M 15/8044* (2013.01); *H04M 15/856* (2013.01); *H04W 8/18* (2013.01); *H04W 88/06* (2013.01)

(58) Field of Classification Search
CPC ..... H04L 43/04; H04L 43/045; H04L 43/062; H04M 15/58; H04M 15/41; H04M 15/60; H04M 15/765; H04M 15/775; H04M 15/80; H04M 15/8044; H04M 15/83; H04M 15/84
USPC .......... 455/405–409, 414.1–414.4, 418–420; 717/168–178
See application file for complete search history.

(56) References Cited

U.S. PATENT DOCUMENTS

| | | |
|---|---|---|
| 7,184,749 B2 | 2/2007 | Marsh et al. |
| 7,277,938 B2 | 10/2007 | Duimovich et al. |
| 7,320,131 B1 | 1/2008 | O'Toole, Jr. |
| 7,406,596 B2 | 7/2008 | Tararoukhine et al. |
| 7,418,532 B2 | 8/2008 | Suzuki et al. |
| 7,532,571 B1 | 5/2009 | Price et al. |
| 7,720,727 B2 | 5/2010 | Keyes et al. |
| 7,904,080 B2 | 3/2011 | Atkins et al. |
| 7,986,935 B1 | 7/2011 | D'Souza et al. |
| 8,064,876 B2 | 11/2011 | Knight |
| 8,160,598 B2* | 4/2012 | Savoor .............. H04W 72/1242 455/450 |
| 8,359,389 B1* | 1/2013 | Cohen et al. ................ 709/224 |
| 8,484,568 B2* | 7/2013 | Rados et al. ................ 715/745 |
| 9,154,550 B1* | 10/2015 | Abgrall .............. H04L 67/1002 |
| 2002/0029273 A1 | 3/2002 | Haroldson et al. |
| 2002/0082991 A1 | 6/2002 | Friedman et al. |
| 2002/0090926 A1 | 7/2002 | Pirkola et al. |
| 2003/0066055 A1 | 4/2003 | Spivey |
| 2003/0115385 A1 | 6/2003 | Adamane et al. |
| 2003/0181242 A1* | 9/2003 | Lee .......................... A63F 13/12 463/42 |
| 2003/0186706 A1 | 10/2003 | Bergins et al. |
| 2004/0111712 A1 | 6/2004 | Humpert et al. |
| 2004/0153587 A1 | 8/2004 | Choi |
| 2004/0176965 A1 | 9/2004 | Winch et al. |
| 2004/0199634 A1 | 10/2004 | Jackowski et al. |
| 2006/0141983 A1 | 6/2006 | Jagannathan et al. |
| 2006/0211404 A1 | 9/2006 | Cromp et al. |
| 2007/0211674 A1 | 9/2007 | Ragnar Karlberg et al. |
| 2007/0294562 A1 | 12/2007 | Takamatsu et al. |
| 2008/0318621 A1 | 12/2008 | Fan et al. |
| 2009/0054030 A1 | 2/2009 | Golds |
| 2009/0068980 A1 | 3/2009 | Creswell et al. |
| 2009/0068984 A1 | 3/2009 | Burnett |
| 2009/0081996 A1 | 3/2009 | Duggal et al. |
| 2009/0138427 A1 | 5/2009 | Kalavade |
| 2009/0172275 A1 | 7/2009 | Nochimowski et al. |
| 2009/0196302 A1 | 8/2009 | Pastorino et al. |
| 2009/0199196 A1 | 8/2009 | Peracha |
| 2009/0203352 A1 | 8/2009 | Fordon et al. |
| 2009/0285201 A1 | 11/2009 | Ben-Haim et al. |
| 2010/0015926 A1 | 1/2010 | Luff |
| 2010/0017506 A1 | 1/2010 | Fadell |
| 2010/0035576 A1 | 2/2010 | Jones et al. |
| 2010/0130163 A1* | 5/2010 | Pousti ........................ 455/406 |
| 2010/0180190 A1 | 7/2010 | Carroll |
| 2010/0191612 A1 | 7/2010 | Raleigh |
| 2010/0318647 A1 | 12/2010 | Savoor et al. |
| 2011/0019566 A1 | 1/2011 | Leemet et al. |
| 2011/0047620 A1* | 2/2011 | Mahaffey et al. .............. 726/23 |
| 2011/0070898 A1 | 3/2011 | Sanjeev et al. |
| 2011/0087985 A1 | 4/2011 | Buchanan et al. |
| 2011/0137776 A1 | 6/2011 | Goad et al. |
| 2011/0145920 A1 | 6/2011 | Mahaffey et al. |
| 2011/0151831 A1 | 6/2011 | Pattabiraman |
| 2011/0176482 A1 | 7/2011 | Vizor et al. |
| 2011/0211465 A1 | 9/2011 | Farrugia et al. |
| 2011/0231551 A1 | 9/2011 | Hassan et al. |
| 2011/0238826 A1 | 9/2011 | Carre et al. |
| 2011/0244826 A1 | 10/2011 | Krishnan et al. |
| 2011/0275344 A1 | 11/2011 | Momtahan et al. |
| 2011/0276442 A1 | 11/2011 | Momtahan et al. |
| 2011/0300865 A1* | 12/2011 | Kashikar et al. .......... 455/435.2 |
| 2012/0054661 A1 | 3/2012 | Rados et al. |
| 2012/0101952 A1 | 4/2012 | Raleigh et al. |
| 2012/0108200 A1 | 5/2012 | Rubin et al. |
| 2012/0117478 A1* | 5/2012 | Vadde ........................ G06F 9/54 715/736 |
| 2012/0142310 A1* | 6/2012 | Pugh et al. .................... 455/406 |
| 2012/0155296 A1 | 6/2012 | Kashanian |
| 2012/0158947 A1 | 6/2012 | Hassan et al. |
| 2012/0163232 A1 | 6/2012 | Yoo |
| 2012/0198046 A1 | 8/2012 | Shah et al. |
| 2012/0208495 A1* | 8/2012 | Lawson et al. ............... 455/406 |
| 2012/0278194 A1* | 11/2012 | Dewan et al. ............... 705/26.1 |
| 2012/0290584 A1 | 11/2012 | De Bona et al. |
| 2012/0315872 A1 | 12/2012 | Amato et al. |
| 2013/0023230 A9 | 1/2013 | Momtahan et al. |
| 2013/0035059 A1 | 2/2013 | Liu |
| 2013/0054378 A1 | 2/2013 | Hao et al. |
| 2013/0060653 A1 | 3/2013 | Sharkey |
| 2013/0117846 A1 | 5/2013 | Mahaffey et al. |
| 2013/0122882 A1 | 5/2013 | Patel et al. |
| 2013/0149994 A1 | 6/2013 | Gaddam et al. |
| 2013/0185292 A1* | 7/2013 | Li ........................ G06F 17/30522 707/723 |

FOREIGN PATENT DOCUMENTS

| | | |
|---|---|---|
| WO | 2012/083285 A2 | 6/2012 |
| WO | 2012/162419 A2 | 11/2012 |

OTHER PUBLICATIONS

Sinofsky, Steven, "Engineering Windows 8 for mobile networks", Retrieved at <<http://blogs.msdn.com/b/b8/archive/2012/01/20/engineering-windows-8-for-mobility.aspx>>, Jan. 20, 2012, pp. 28.

"Rapid Mobile Data Service Creation and Monetization", Available at <<http://www.amdocs.com/Products/network-control/Documents/data-experience-solution-datasheet.pdf>>, 2012, 7 Pages.

"Final Office Action Received for U.S. Appl. No. 13/721,029", dated Oct. 1, 2014, 19 Pages.

"Non-Final Office Action Received for U.S. Appl. No. 13/721,029", dated Mar. 11, 2014, 13 Pages.

(56) References Cited

OTHER PUBLICATIONS

"Non-Final Office Action Received for U.S. Appl. No. 13/721,032", dated Aug. 5, 2014, 16 Pages.
"Non-Final Office Action Received for U.S. Appl. No. 13/721,032", dated Feb. 6, 2014, 11 Pages.
"Non-Final Office Action Received for U.S. Appl. No. 13/721,041", dated Mar. 28, 2014, 15 Pages.
"Applicant Initialed Interview Summary for U.S. Appl. No. 13/721,053", dated May 30, 2014, 3 Pages.
"Examiner Initialed Interview Summary for U.S. Appl. No. 13/721,053", dated Aug. 19, 2014, 2 Pages.
"Non-Final Office Action Issued for U.S. Appl. No. 13/721,053", dated Mar. 18, 2014, 8 Pages.
"Notice of Allowance Issued for U.S. Appl. No. 13/721,053", dated Oct. 28, 2014, 7 Pages.
"Notice of Allowance Issued for U.S. Appl. No. 13/721,053", dated Aug. 19, 2014, 13 Pages.
"Final Office Action Received for U.S Appl. No. 13/721,058", dated Sep. 22, 2014, 15 Pages.
"Non-Final Office Action Received for U.S. Appl. No. 13/721,058", dated Apr. 16, 2014, 11 Pages.
"Final Office Action Received for U.S. Appl. No. 13/721,069", dated Nov. 28, 2014, 23 Pages.
"Non-Final Office Action Received for U.S. Appl. No. 13/721,069", dated Mar. 14, 2014, 14 Pages.
"Supplementary Search Report Issued for European Patent Application No. 13741434.8", dated Sep. 30, 2014, 3 Pages.
"Supplementary Search Report Issued for European Patent Application No. 13741633.5", dated Sep. 18, 2014, 3 Pages.
Balasubramanian, Aruna, "Architecting Protocols to Enable Mobile Applications in Diverse Wireless Networks", A Dissertation Submitted to the Graduate School of the University of Massachusetts Amherst in Partial Fulfillment of the Requirements for the Degree of Doctor of Philosophy, Feb. 2011, 198 Pages.
Heikkinen, et al., "Measuring Mobile Peer-to-Peer Usage: Case Finland 2007", In Proceedings of the 10th International Conference on Passive and Active Network Measurement, Mar. 28, 2009, pp. 165-174.
Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.
"International Search Report & Written Opinion Issued for PCT Application No. PCT/US2013/022353", dated May 15, 2013, 10 Pages.
"International Search Report & Written Opinion Issued for PCT Application No. PCT/US2013/022822", dated Apr. 25, 2013, 9 Pages.
Peddemors, Arjan, "Network Resource Awareness and Prediction on Mobile Devices", Novay PhD. Research Series, No. 026 (Novay/PRS/026), Oct. 2009, 236 Pages.

Unuth, Nadeem, "Data Usage Monitor Apps for Your iPhone and iPad", Retrieved Date: Oct. 8, 2012 Available at: http://voip.about.com/od/voipbandwidth/tp/Data-Usage-Monitor-Apps-For-Your-Iphone-And-Ipad.htm, 1 page.
"My Data Usage Pro", Retrieved Date: Dec. 12, 2014, Available at: http://download.cnet.com/My-Data-Usage-Pro/3000-2094_4-75402502.html, 3 pages.
"DataMan Pro for iPad—Analyze your 3G Data Usage on Your Computer", Published Date: Jul. 9, 2011, Available at: http://prmac.com/release-id-27794.htm, 2 pages.
"Notice of Allowance Issued in U.S. Appl. No. 13/721,032", dated Jan. 30, 2015, 13 Pages.
"Non-Final Office Action Issued in U.S. Appl. No. 13/721,041", dated Jan. 7, 2015, 21 Pages.
"Non-Final Office Action Issued in U.S. Appl. No. 13/721,058", dated Jan. 22, 2015, 13 Pages.
"Non-Final Office Action Issued in U.S. Appl. No. 13/721,066", dated Feb. 13, 2015, 17 Pages.
"Office Action Issued in European Patent Application No. 13741434.8", dated Nov. 27, 2014, 6 Pages.
"Office Action Issued in European Patent Application No. 13741633.5", dated Nov. 27, 2014, 7 Pages.
"Mobile Data Usage Meter—Manage Mobile Data Usage & Wireless Broadband Devices", Published on: Dec. 28, 2009, Available at: http://web.archive.org/web/20091228092436/http://www.telstrabusiness.com/business/portal/online/site/myaccount/mobiledatausagemeter.94003, 2 pages.
Rhee, Ed, "How to Track Data Usage on your Android Phone", Published on: Jul. 8, 2011, Available at: http://www.cnet.com/how-to/how-to-track-data-usage-on-your-android-phone/, 4 pages.
"Non-Final Office Action Issued in U.S. Appl. No. 13/721,029", dated Mar. 17, 2015, 25 Pages.
"Final Office Action Issued in U.S. Appl. No. 13/721,041", dated Sep. 14, 2015, 24 Pages.
"Notice of Allowance Issued in U.S. Appl. No. 13/721,058", dated May 8, 2015, 7 Pages.
"Notice of Allowance Issued in U.S. Appl. No. 13/721,058", dated Sep. 14, 2015, 3 Pages.
"Final Office Action Issued in U.S. Appl. No. 13/721,066", dated Oct. 15, 2015, 20 Pages.
"Non-Final Office Action Issued in U.S. Appl. No. 13/721,069", dated Jul. 7, 2015, 27 Pages.
"Non-Final Office Action Issued in U.S. Appl. No. 13/721,083", dated Jun. 5, 2015, 10 Pages.
"Notice of Allowance Issued in U.S. Appl. No. 13/721,083", dated Oct. 5, 2015, 8 Pages.
"Notice of Allowance Issued in European Patent Application No. 13741633.5", dated Aug. 6, 2015, 5 Pages.
"Final Office Action Issued in U.S. Appl. No. 14/642,378", dated Oct. 19, 2015, 12 Pages.
"Non-Final Office Action Issued in U.S. No. 14/642,378", dated Jun. 12, 2015, 12 Pages.
"International Preliminary Report on Patentability Issued in PCT Application No. PCT/US13/022822", dated Aug. 7, 2014, 6 Pages.
"International Preliminary Report on Patentability Issued in PCT Application No. PCT/US13/22353", dated Aug. 7, 2014, 7 Pages.

* cited by examiner

RECOMMENDATIONS FOR REDUCING DATA CONSUMPTION BASED ON DATA USAGE PROFILES

CROSS-REFERENCE TO RELATED APPLICATIONS

This application claims the benefit of pending U.S. Provisional Application No. 61/696,472, filed Sep. 4, 2012, pending U.S. Provisional Application No. 61/591,503, filed Jan. 27, 2012, and pending U.S. Provisional Application No. 61/591,509, filed Jan. 27, 2012. The entirety of these provisional applications is hereby incorporated by reference herein.

This application is related to the following applications: U.S. patent application entitled "Tracking Data Usage Under a Schematized Data Usage Plan," U.S. patent application entitled "Managing Data Transfers Over Network Connections Based on Priority and a Data Usage Plan," U.S. patent application entitled "On-Device Attribution of Network Data Usage," U.S. patent application entitled "Predicting Network Data Consumption Relative to Data Usage Patterns," U.S. patent application entitled "Updating Dynamic Data Usage Plans and Statistics," U.S. patent application entitled "Data Usage Profiles for Users and Applications," U.S. patent application entitled "Dynamically Adjusting a Data Usage Plan Based on Data Usage Statistics," and U.S. patent application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering simple unlimited mobile data plans to offering capped and metered plans. Some of these capped and metered plans are complex, with allotted data caps varying based on network type, time of day, etc. Further, the fees for exceeding the allotted data caps may be significant and may also vary based on network type, time of day, etc. The existing systems generally lack mechanisms to help the user understand and manage network data consumption per user and per application in view of the data usage plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can adversely impact the user experience, leading to dissatisfied customers, increased customer service calls, and negative impressions of the mobile operators.

SUMMARY

Embodiments of the disclosure profile data usage for users based on installed applications. A computing device or cloud service determines a plurality of applications installed on the computing device. Data usage patterns associated with each of the determined plurality of applications are identified. The data usage patterns describe data usage over a network for at least one of the determined plurality of applications. One or more recommendations for reducing data usage are defined based on the identified data usage patterns.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
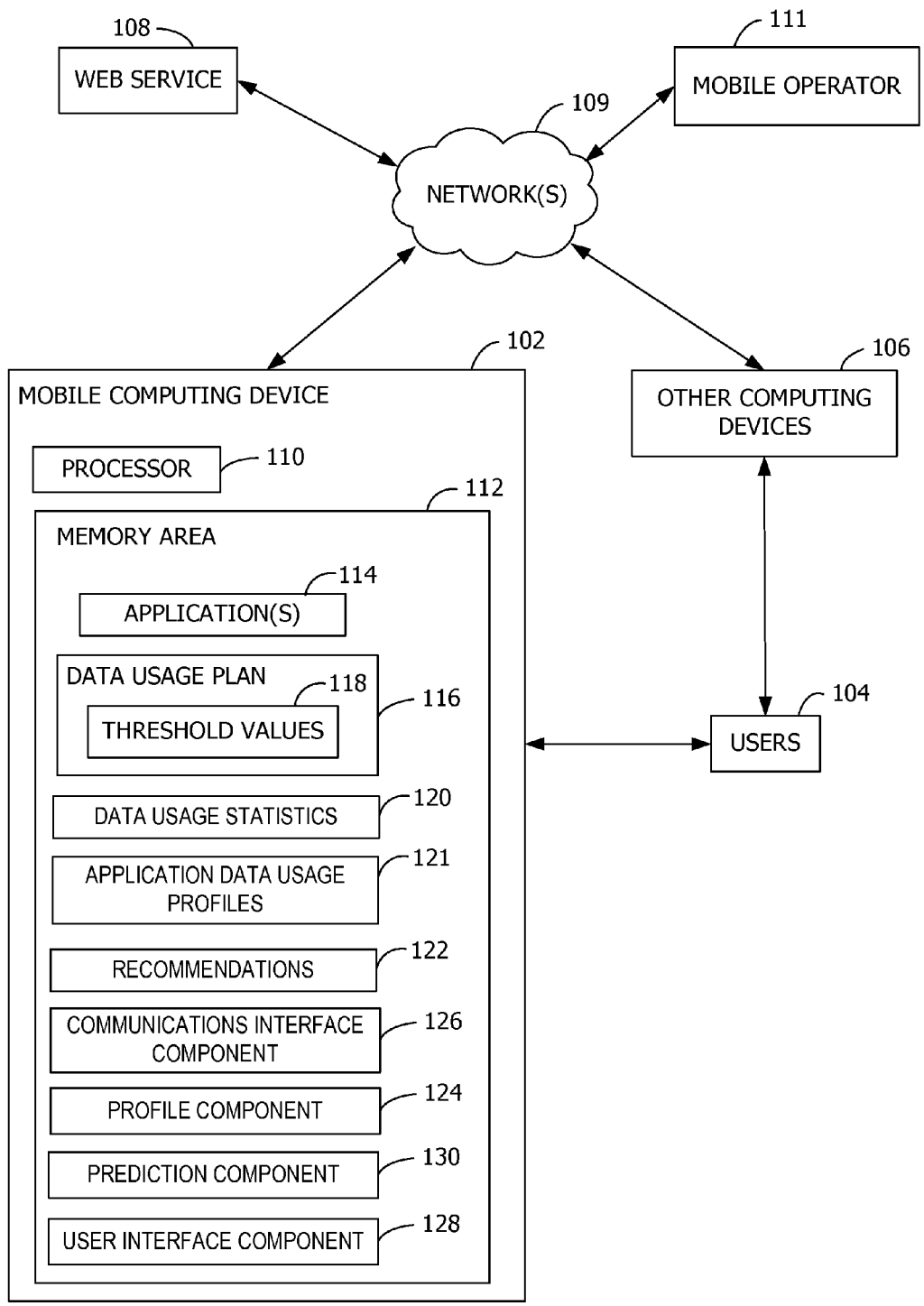
FIG. 1 is an exemplary block diagram illustrating a web service interacting with a mobile operator and user computing devices.

Referring to the figures, embodiments of the disclosure profile applications 114 with reference to network data transfers to enable recommendations 122 for altering the amount of network data usage. In some embodiments, application data usage profiles 121 are identified for each installed application 114 on a computing device. Recommendations 122 for reducing data usage are defined based on data usage patterns associated with the identified application data usage profiles 121 in view of data usage plans 116. The data usage plans 116 have threshold values 118 defining an amount of network data available over a particular interval (e.g., a billing cycle).

For example, if the computing device determines that users 104 who install a particular set of applications 114 usually exceed their data usage plans 116 within one billing cycle (e.g., determined based on the application data usage profiles 121 associated with the set of applications 114), the computing device recommends changes to reduce data transfers. Exemplary changes include exchanging an application 114 of one type with another application 114 of the same type, exchanging one application 114 for a different application 114, changing mobile operators 111 and/or data usage plans 116, uninstalling an application 114, and the like, as further described below.

Referring to FIG. 1, an exemplary block diagram illustrates a web service 108 interacting with the mobile operators 111 and user computing devices. The user computing devices include, for example, a mobile computing device 102 and other computing devices 106. The user computing devices communicate over one or more networks 109. One or more of the user computing devices are associated with at least one of the data usage plans 116. In some embodiments, a plurality of the user computing devices may share network data consumption allotted under the same or common data usage plan 116. For example, the mobile computing device 102 may represent a mobile telephone of the user 104, while the other computing devices 106 sharing the same data usage plan 116 may include a tablet and a laptop associated with the user 104. In other embodiments, each of the mobile computing device 102 and the other user computing devices has a separate data usage plan 116.

The user computing devices include any device executing instructions (e.g., as applications 114, operating system functionality, or both) to implement operations and functionality. The user computing devices may include, for example, the mobile computing device 102 or any other portable device. In some embodiments, the mobile computing device 102 includes a mobile telephone, laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108.

In some embodiments, the mobile computing device 102 has at least one processor 110, a memory area 112, and at least one user interface (not shown). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures.

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The mobile computing device 102 further establishes and maintains one or more network connections representing communication channels or other means for sending and/or receiving data over the network 109. Exemplary network connections include, but are not limited to, Wi-Fi, cellular, tethered, BLUETOOTH brand communication, near-field communication (NFC), and more. The network connections may also be categorized into voice, text, data, or other categories or types of network traffic.

The memory area 112 further stores at least one data usage plan 116. The data usage plan 116 describes the services provided by the mobile operator 111, such as the amount of network data the user 104 can consume during a particular duration (e.g., a billing cycle). For example, the user 104 has contracted with the mobile operator 111 to receive such network data transfer services from the mobile operator 111. In the example of FIG. 1, the data usage plan 116 describes threshold values 118 associated with the network connections of one or more devices of the user 104. The threshold values 118 represent a maximum amount of network data consumption allotted under the data usage plan 116 for the network connections. For example, one threshold value 118 may indicate a maximum amount of network data consumption for a Wi-Fi connection, while another threshold value 118 indicates a maximum amount of network data consumption for a cellular data connection.

The memory area 112 may also store data usage statistics 120 collected, generated, or received by the mobile computing device 102, the web service 108, and/or the mobile operators 111. The data usage statistics 120 represent data usage by the plurality of applications 114 under at least one of the data usage plans 116 available to the mobile computing device 102.

The memory area 112 may also store one or more application data usage profiles 121. Each of the application data usage profiles 121 describe or correspond to particular data usage statistics 120, data usage types, data usage patterns, or other data use characteristics such as total consumption, consumption during particular intervals, etc. for one or more of the applications 114. Alternatively or in addition, the web service 108, the mobile operator 111, and/or the other computing devices 106 may store one or more of the application data usage profiles 121.

For example, in some embodiments, the web service 108 may store one or more of the application data usage profiles 121. For example, the web service 108 may push copies of defined sets of the application data usage profiles 121 to the mobile computing device 102.

The memory area 112 further stores one or more recommendations 122. The recommendations 122 may be defined by the mobile computing device 102 and/or received from another entity such as the web service 108. For example, the web service 108 may push a set of pre-defined recommendations 122 each having particular conditions, criteria, or other triggers associated therewith. The recommendations 122 may also have other rules (e.g., recommendation rules) associated therewith. The rules identify when, or under what circumstance or scenario, to provide a particular recommendation 122 to the user 104. Exemplary conditions to trigger selection and sharing of at least one of the recommendations 122 include, but are not limited to, determining that a particular application 114 is data intensive relative to the data usage plan 116 of the user 104 (e.g., consumes at least a threshold portion of an amount allotted under the data usage plan 116), determining that a particular application 114 has not been executed recently but still consumes a large amount of network data, and/or determining that a particular application 114 is rarely executed but still consumes a large amount of network data. As such, the conditions may relate to the recency or frequency of execution of the applications 114.

In response to occurrence of the exemplary conditions, exemplary recommendations 122 include, but are not limited to, adjusting the installed applications 114 (e.g., uninstalling an application 114, exchanging one application 114 for another, etc.), suggesting additional services (e.g., including services not offered by the mobile operator 111, such as Wi-Fi hotspot services found to be available for the user 104 in the area of the user 104 that fit the data usage pattern of the user 104), and/or identifying data usage plans 116 with higher or lower threshold values 118.

The memory area 112 further stores exemplary computer-executable components such as a communications interface component 126, a profile component 124, a prediction component 130, and a user interface component 128. In some embodiments, the communications interface component 126 includes a network interface card and/or computer-executable instructions (e.g., a driver) for operating the network interface card. In some embodiments, the communications interface is operable with near-field communication (NFC) tags.

The user interface component 128 may include a graphics card for displaying data to the user 104 and receiving data from the user 104. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device in a particular way.

Operation of the communications interface component 126, the profile component 124, the prediction component 130, and the user interface component 128 is described below with reference to FIG. 3.

Figure 2:
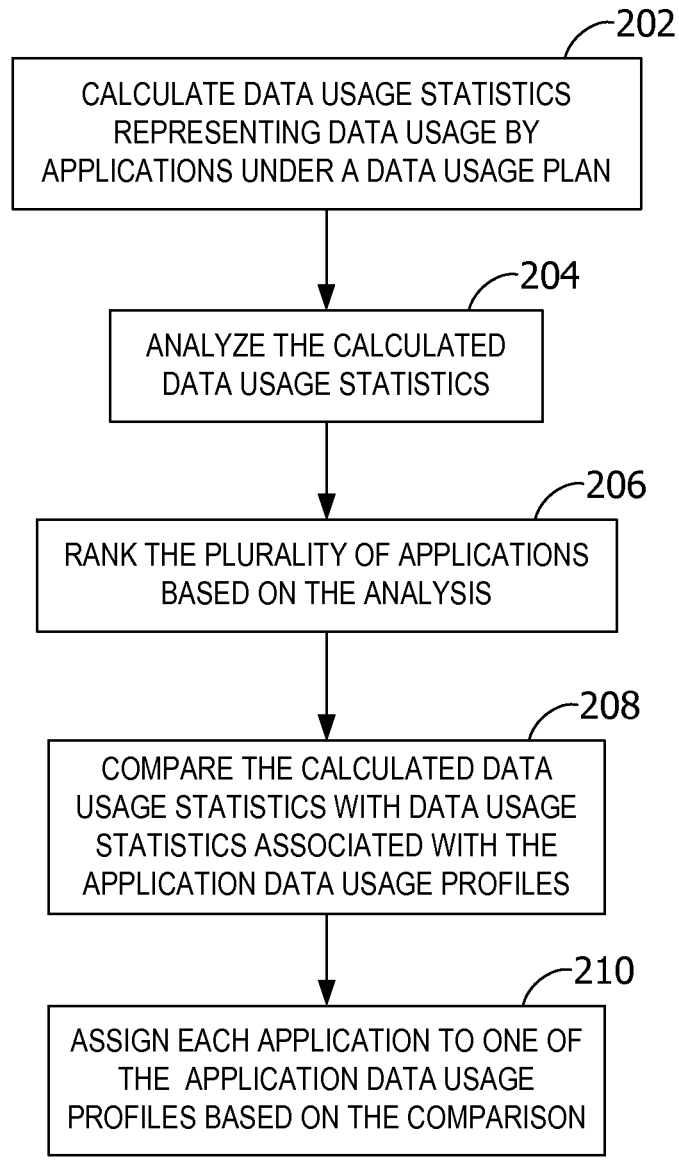
FIG. 2 is an exemplary flow chart illustrating operation of a user computing device to profile applications based on network data consumption.

Referring next to FIG. 2, an exemplary flow chart illustrates operation of the user computing device to profile applications 114 based on network data consumption. While the operations illustrated in FIG. 2 are described as being performed by the mobile computing device 102 or other user computing device in some embodiments (e.g., by an operating system executing thereon), one or more of the operations may be performed by other devices, including any computing device local to, or remote from, the user 104. For example, the operations may be performed by a proxy device in communication with the web service 108.

At 202, the mobile computing device 102 calculates the data usage statistics 120 associated with the plurality of applications 114 stored in the memory area 112 of the mobile computing device 102. The calculated data usage statistics 120 represent data usage by one or more of the plurality of applications 114 under the data usage plan 116 available to the mobile computing device 102. The data usage statistics 120 may be viewed as a current or instant snapshot of the amount of data transmitted and/or received by the mobile computing device 102, and possibly by one or more of the other user computing devices that share the data usage plan 116. For example, the data usage statistics 120 identify the amount of data transmitted and/or received to a granularity of time (e.g., per minute) or data (e.g., per kilobyte), as well as the application 114 requesting the network data consumption and the network connections used for the transfer. The data usage statistics 120 may describe the plurality of applications 114, one of the applications 114, or a portion of one of the applications 114. In this manner, the applications 114, or portions thereof, may be compared and contrasted with each other.

In some embodiments, a background transfer service (e.g., a download manager) executing on the mobile computing device 102 queues requests to download/upload data. Existing systems do not show or track which applications 114 make each request. In contrast, with aspects of the disclosure, the mobile computing device 102 disambiguates or attributes the request to the requesting application 114 for tracking purposes. For example, each application 114 registers at least one identifier with the operating system, application 114, or web service 108 that collects the data usage statistics 120. Applications 114 may register additional identifiers to increase the granularity of resource tracking (e.g., a mail program may track data transfers for each mail account).

Additional and/or other data usage statistics 120 are contemplated. For example, the data usage statistics 120 may identify the amount of data consumed, the time and date of usage, the location of usage, network interface used, the subscriber identity module (SIM) card or other user identity module used for dual SIM scenarios, the international mobile station equipment identity (IMEI) or other device identifier for multi-device scenarios, the Internet protocol (IP) address or other address of the access point used for Wi-Fi scenarios, the IP address or other address of the target computer (e.g., for whitelist/blacklists in data usage), and the application responsible for the data transfer. The data usage statistics 120 may relate to text messages, data, voice calls, minutes used, voice over Internet Protocol (VoIP) usage, and any other element of usage consumed by, or that impacts, the mobile computing device 102.

In some examples, the mobile computing device 102 tracks or monitors network data consumption by the mobile computing device 102 by compiling the data usage statistics 120 directly (e.g., monitoring network traffic). For example, the mobile computing device 102 collects ongoing usage data relating to network data transfers, such as from device radios, drivers, and accelerometers. In other embodiments, the mobile computing device 102 calculates the data usage statistics 120 by collecting or receiving the data usage statistics 120 from the web service 108 and/or the mobile operator 111.

The data usage statistics 120 may further represent network data consumed under the data usage plan 116 by each of the user computing devices sharing the data usage plan 116, not just the mobile computing device 102 alone. In such embodiments, the mobile computing device 102 may receive updates of network data consumption by the other user computing devices sharing the same data usage plan 116. The updates may be received from the other user computing devices directly, or from an aggregator such as the web service 108. For example, the data usage statistics 120 may represent the network data collectively consumed by a mobile telephone, tablet, and laptop of the user 104 that share the same data usage plan 116.

In examples in which a plurality of data usage plans 116 are available to the mobile computing device 102, the mobile computing device 102 (or the web service 108) collects the data usage statistics 120 corresponding to each of the data usage plans 116. In such an example, there may a plurality of sets of data usage statistics 120 (e.g., one set for each data usage plan 116).

At 204, the mobile computing device 102 analyzes the calculated data usage statistics 120. Analyzing the calculated data usage statistics 120 includes, for example, profiling the applications 114 or otherwise analyzing usage patterns among the applications 114 to enable comparison of the applications 114 based on data consumption. The patterns relate to the way the user 104 uses the services of the mobile operator(s) 111 via the mobile computing device 102. For example, the mobile computing device 102 may analyze the data usage statistics 120, aggregated from a plurality of the applications 114, to:

identify those applications 114 that consume the most network data or the least network data
identify when network data is consumed the most or least (e.g., what time of day)
identify where network data is consumed most or least (e.g., the location of the mobile computing device 102)
determine the amount of data sent or received over each network connection
determine the amount of data sent while roaming and not roaming
determine how frequently the user 104 uses each network connection In embodiments in which the mobile computing device 102 aggregates data usage statistics 120 from a plurality of the user computing devices (or when the operations illustrated in FIG. 2 are performed by the web service 108), information describing the mobile operators 111 and data usage plans 116 may be derived. For example, the mobile computing device 102 may determine which mobile operators 111 and data usage plans 116 are being used by the user computing devices. The mobile computing device 102 may also analyze the types of data usage plans 116, including the threshold values 118 associated with the data usage plans 116.

At 206, the mobile computing device 102 ranks the plurality of applications 114 based on the analysis. For example, the mobile computing device 102 orders the plurality of applications 114 from lowest data usage to highest data usage, or vice versa.

In embodiments involving the application data usage profiles 121 such as shown in FIG. 1, the mobile computing device 102 compares at 208 the calculated data usage statistics 120 associated with each of the applications 114 with data usage statistics 120 associated with the application data usage profiles 121. Comparing includes, for example, matching or correlating the calculated data usage statistics 120 associated with each of the applications 114 with the data usage statistics 120 associated with the application data usage profiles 121 to identify one of the application data usage profiles 121 corresponding to each of the applications 114. The identified application data usage profile 121 for each of the applications 114 describes the data usage of that application 114. In this manner, the mobile computing device 102 assigns at 210 each of the plurality of applications 114 to one of the plurality of application data usage profiles 121 based on the comparison of the data usage statistics 120.

In other embodiments, each application data usage profile is applicable to one or more of the applications 114. For example, each application data usage profile has one or more application identifiers associated therewith, and the mobile computing device 102 assigns each of the applications 114 to one of the application data usage profiles 121 by matching application identifiers.

The mobile computing device 102 may further rate each of the applications 114 in terms of data usage (e.g., based on the assigned application data usage profile 121). For example, if Application A is assigned to a "high network data consumption" application data usage profile 121 while Application B is assigned to a "moderate network data consumption" application data usage profile 121, the mobile computing device 102 may rank Application A higher than Application B in terms of network data consumption.

Figure 3:
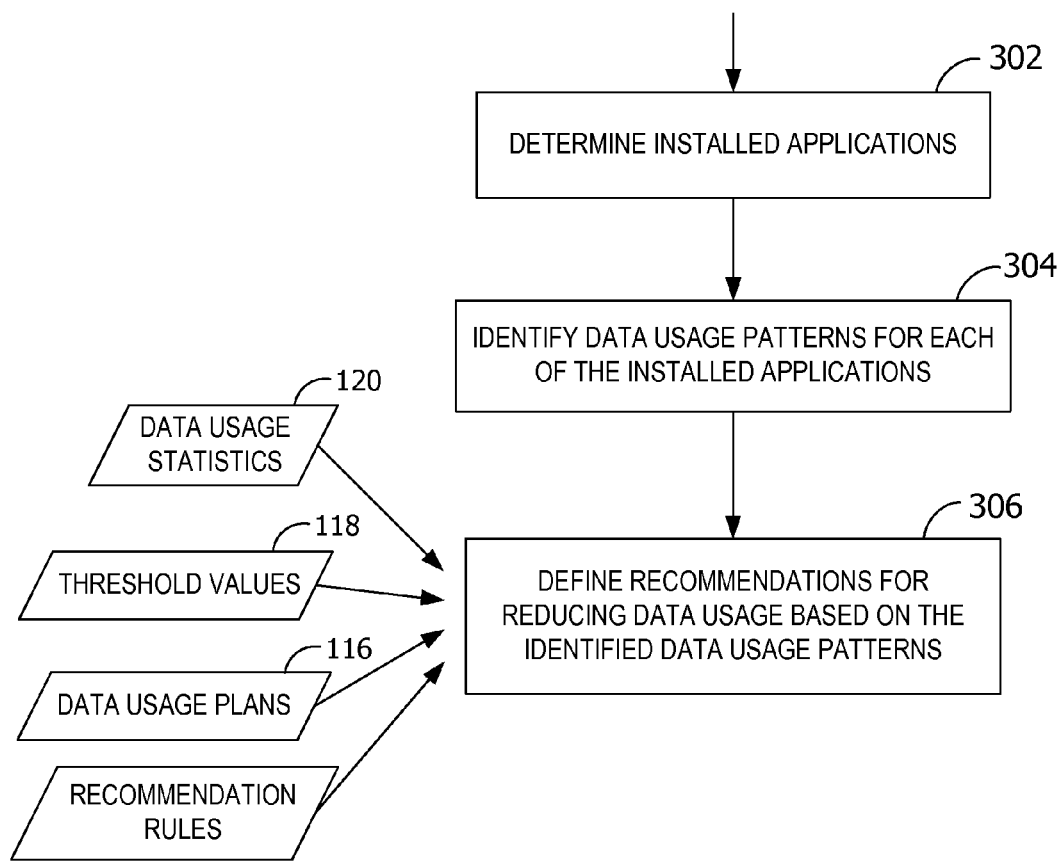
FIG. 3 is an exemplary flow chart illustrating operation of a computing device to define recommendations for reducing data usage based on data usage patterns.

Referring next to FIG. 3, an exemplary flow chart illustrates operation of a computing device to define recommendations 122 for reducing data usage based on data usage patterns. While the operations illustrated in FIG. 3 are described are being performed by the mobile computing device 102 in some embodiments, one or more of the operations may be performed by other devices, including any computing device local to, or remote from, the user 104. For example, the operations may be performed by the web service 108 (e.g., a remote web service) or other cloud service. The operations may also be performed by a proxy device in communication with the web service 108. Further, the operations may be performed at an operating system level or an application program level. Further, the operations illustrated in FIG. 3 may be executed asynchronously, such as by separate threads in communication with one another or accessing shared storage. The operations may also be performed on a periodic or continuous basis. For example, the operations may be performed every time a new application 114 is installed, every time the computing device is rebooted, every day, etc.

At 302, the mobile computing device 102 determines the applications 114 installed on the mobile computing device 102. For example, the mobile computing device 102 identifies a set or list of the installed applications 114 (e.g., available for execution by the mobile computing device 102). At 304, the mobile computing device 102 identifies the data usage patterns for each of the installed applications 114. The data usage patterns represent or otherwise describe an amount of network data consumed by the corresponding application 114. For example, the data usage patterns identify the type of data transmitted and/or received, time/day/month/year of data usage, type of data usage, type of service, and the like.

In some embodiments, the mobile computing device 102 identifies the data usage patterns by identifying the application data usage profiles 121 that correspond to the installed applications 114. Each of the application data usage profiles 121 has one or more data usage patterns associated therewith. In general, each of the application data usage profiles 121 and corresponding data usage patterns describe data usage over the network 109 for at least one of the applications 114 installed on the mobile computing device 102.

Matching or assigning one of the installed applications 114 to at least one of the application data usage profiles 121 includes, for example, identifying one of the application data usage profiles 121 as a function of, or based on, an application identifier associated with the application 114. For example, Application Data Usage Profile A may apply to Application A, while Application Data Usage Profile B applies to Application B.

In other embodiments, the application data usage profiles 121 may be matched based on application type. For example, each of the application data usage profiles 121 may identify the application types to which the corresponding data usage patterns apply. For example, Application Data Usage Profile A may apply to mail applications while Application Data Usage Profile B may apply to instant messaging applications.

In still other embodiments, the mobile computing device 102 matches one of the installed applications 114 with at least one of the application data usage profiles 121 by comparing the data usage statistics 120 associated with the application 114 with the data usage statistics 120 associated with the application data usage profiles 121. The application data usage profile that has data usage statistics 120 equaling, approximately equaling, or most closely matching, the data usage statistics 120 of a particular application 114 is identified as the matching application data usage profile for that application 114. Alternatively or in addition, the mobile computing device 102 matches one of the installed applications 114 with at least one of the application data usage profiles 121 by identifying similarities in the data usage patterns such as the amount of network data consumed during a particular time interval, variations in network data consumption over time, and the like.

In some embodiments, the mobile computing device 102 combines the data usage patterns associated with the installed applications 114 to predict future data usage by the applications 114. In this manner, the mobile computing device 102 is able to compare the collective, cumulative, or otherwise aggregated predicted data usage of the installed applications 114 to the threshold values 118 of the data usage plan 116. The comparison is used to predict whether the threshold values 118 are anticipated to be exceeded (e.g., thus incurring excess network data consumption charges) or underutilized (e.g., thus incurring wasted cost to the user 104) with continued execution of the installed applications 114.

At 306, the mobile computing device 102 defines one or more recommendations 122 for reducing data usage based on the identified application data usage profiles 121 for the installed applications 114. For example, the mobile computing device 102 defines the recommendations 122 to avoid exceeding the threshold values 118 based on the current data usage and/or the predicted data usage. As another example, the mobile computing device 102 defines the recommendations 122 to avoid underutilizing the data usage permitted by the threshold values 118 based on the current data usage and/or the predicted data usage. Other factors or criteria may affect the recommendations 122, such as one or more of the following: the data usage statistics 120, the threshold values 118, the current data usage plan 116 (e.g., in which the user 104 has enrolled the mobile computing device 102), other data usage plans 116, and the recommendation rules.

Exemplary recommendations 122 include, but are not limited to, the following:
  uninstall at least one of the installed applications 114
  replace or exchange at least one of the applications 114 with another application 114 that provides the same or similar functionality (e.g., of the same type) but consumes less network data
  change a current data usage plan 116 to another data usage plan 116 (e.g., with higher or lower threshold values 118)
  change a current mobile operator 111 to another mobile operator 111

For example, if the user 104 is consuming significantly more or less network data (e.g., by a threshold amount or percentage) than the current data usage plan 116 allows (e.g., based on the threshold values 118), the mobile computing device 102 recommends that the user 104 switch from the current data usage plan 116 to another data usage plan 116 (e.g., with higher or lower threshold values 118). In this manner, the mobile computing device 102 identifies possible cost savings to the user 104.

Figure 4:
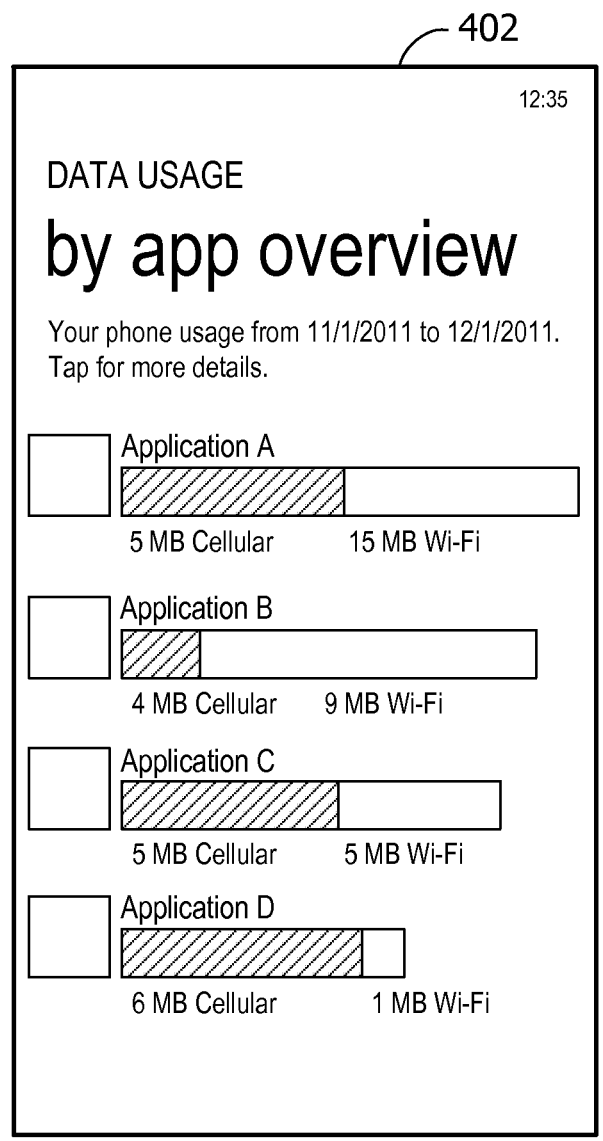
FIG. 4 is an exemplary user interface illustrating an overview of data usage per application.

In some embodiments, the mobile computing device 102 further ranks the installed applications 114 based on the identified data usage patterns (e.g., see FIG. 4). Ranking the installed applications 114 and presenting the rankings to the user 104 enables the user 104 to quickly compare and contrast the data usage of the installed applications 114.

Aspects of the disclosure contemplate execution of the computer-executable components illustrated in FIG. 1 to perform one or more of the operations illustrated and/or described with reference to FIG. 3. For example, the communications interface component 126, when executed, causes the processor 110 to receive the data usage statistics 120 for a plurality of applications 114.

The profile component 124, when executed, causes the processor 110 to compare the data usage statistics 120 received for the applications 114 by the communications interface component 126 with data usage statistics 120 associated with the application data usage profiles 121. For example, the profile component 124 matches the data usage statistics 120 received for each of the applications 114 with the data usage statistics 120 associated with one of the application data usage profiles 121. Comparing the data usage statistics 120 in this manner enables the profile component 124 to assign each of the applications 114 to one of the application data usage profiles 121.

The prediction component 130, when executed, causes the processor 110 to define recommendations 122 for reducing data usage for one or more of the applications 114 based on the application data usage profile assigned by the profile component 124. If the prediction component 130 predicts that anticipated data usage over a time interval (e.g., a billing cycle for the data usage plan 116) will exceed the threshold value(s) 118 associated with the data usage plan 116), the user interface component 128, when executed, sends a notification of the prediction to the user 104. The user interface component 128 may also send a notification to the user 104 when the anticipated data usage is predicted to be close to the threshold value 118 (e.g., a certain percentage of the threshold value 118, such as 90%). The notifications may take the form of data management hints or tips, such as when a particular application 114 or service may be more applicable to the user 104 given the user interaction, data usage patterns, and/or the application data usage profiles 121. The notifications take the form of a badge or icon in the application marketplace, a note, a pop up or toast, and/or a live or active tile update that prompts the user 104 to accept an enhanced experience and/or reduced service costs. The service costs may be in financial costs (e.g., dollars, in view of the data usage plan 116), or other costs such as resource costs. In some embodiments, the tile represents a tile user interface element.

In some embodiments, the profile component 124 defines recommendations 122 by suggesting or recommending that the user 104 change data usage plans 116. In such embodiments, the profile component 124 obtains information describing at least one data usage plan 116 competing with the current data usage plan 116 of the user 104 and presents the obtained information to the user 104 for review and selection to help the user 104 prevent or reduce the amount paid to transfer data over the networks 109.

Referring next to FIG. 4, an exemplary user interface 402 of the mobile computing device 102 illustrates an overview of data usage per application 114. In the example of FIG. 4, the user interface 402 displays network data consumption over cellular and Wi-Fi networks for each of four applications 114 executing on the mobile computing device 102: Application A has consumed 5 megabytes (MB) of cellular data and 15 MB of Wi-Fi data, Application B has consumed 4 MB of cellular data and 9 MB of Wi-Fi data, Application C has consumed 5 MB of cellular data and 5 MB of Wi-Fi data, and Application D has consumed 6 MB of cellular data and 1 MB of Wi-Fi data. While the user interface 402 in FIG. 4 illustrates only cellular and Wi-Fi data consumption, the network data used over other networks 109 may be displayed alternatively or in addition. Further, the applications 114 may be ranked in order of total bandwidth consumption (e.g., total network data consumption) or consumption by network or connection type (e.g., cellular, Wi-Fi, etc.).

In some embodiments (not shown), the user interface 402 may show consumption of resources other than network data, such as power and/or memory consumption by each of the applications 114.

Figure 5:
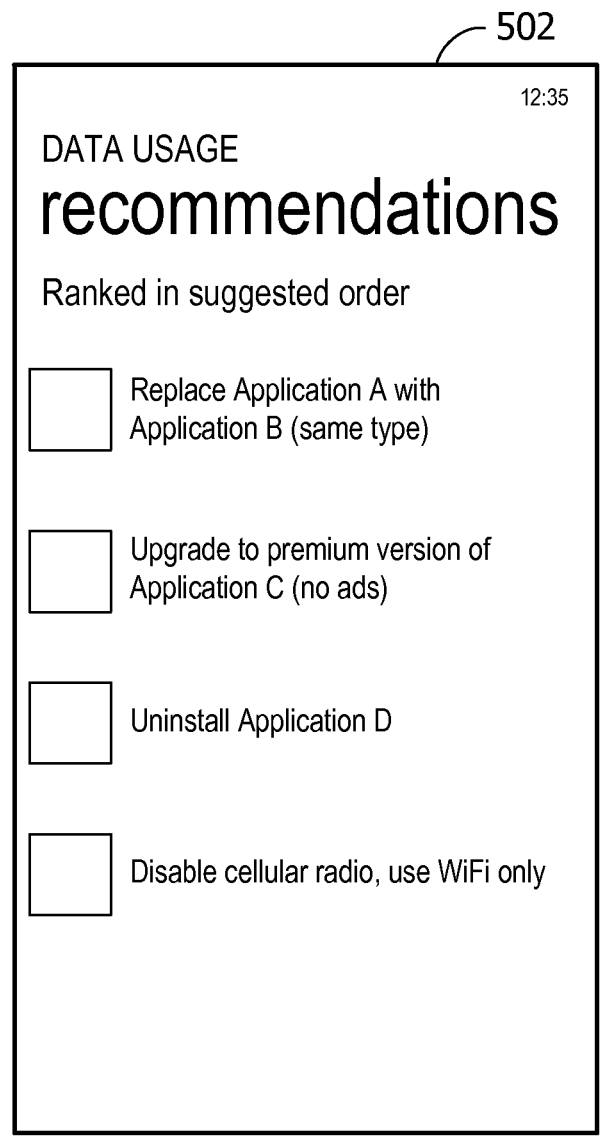
FIG. 5 is an exemplary user interface illustrating recommendations for reducing data usage.

Referring next to FIG. 5, an exemplary user interface 502 illustrates recommendations 122 for reducing data usage. In the example of FIG. 5, the mobile computing device 102 or the web service 108 has defined or created recommendations 122 for reducing data usage based on the application data usage profiles 121 assigned to the installed applications 114 or to the user 104.

For example, the mobile computing device 102 has determined that switching from Application A to Application B will reduce data consumption. Application A and Application B are of the same type (e.g., mail applications, video streaming applications, etc.). In some embodiments (not shown), the mobile computing device 102 may recommend that the user 104 install a new application 114 anticipated to reduce data usage. For example, the mobile computing device 102 recommends installing a VoIP voice calling application as a replacement for making cellular voice calls if the mobile computing device 102 concludes that Wi-Fi is frequently available to the user 104.

As another example, the mobile computing device 102 recommends upgrading to the ad-free version of Application C. In this example, the user 104 has installed the free version of Application C, but the mobile computing device 102 has predicted, based on the application data usage profile associated with the free version, that the user 104 will exceed the threshold values 118 of the data usage plan 116 (e.g., the free version may include server-delivered advertisements that consume significant network data). As such, the mobile computing device 102 recommends that the user 104 pay for a premium, yet ad-free, version of Application C, which has reduced network data consumption based on the application data usage profile associated with the premium version. While the initial cost of the premium version is higher than the initial cost of the free version, the reduced network data consumption of the premium version presents a cost savings over the higher network data consumption of the free version, for this user 104.

As still another example, the mobile computing device 102 has concluded, based on the application data usage profile associated with Application D, that continued execution of Application D is expected to push the network data usage over the threshold values 118. As such, the mobile computing device 102 recommends uninstalling Application D or otherwise preventing Application D from executing. In this example, the mobile computing recommends uninstallation because no other application 114 of the same type as Application D is available.

In still another example, the mobile computing device 102 offers the user 104 the option to disable the cellular radio to prevent any further cellular network data usage. The user 104 may select such an option if, for example, the user 104 wants to preserve network data consumption in anticipation of an increase (e.g., a spike) in data usage in a future portion of the billing cycle. Alternatively or in addition, the mobile computing device 102 may have concluded that no adjustment of the installed applications 114 will prevent the user 104 from exceeding the threshold values 118 (e.g., the user 104 is within 95% of the threshold values 118).

Figure 6:
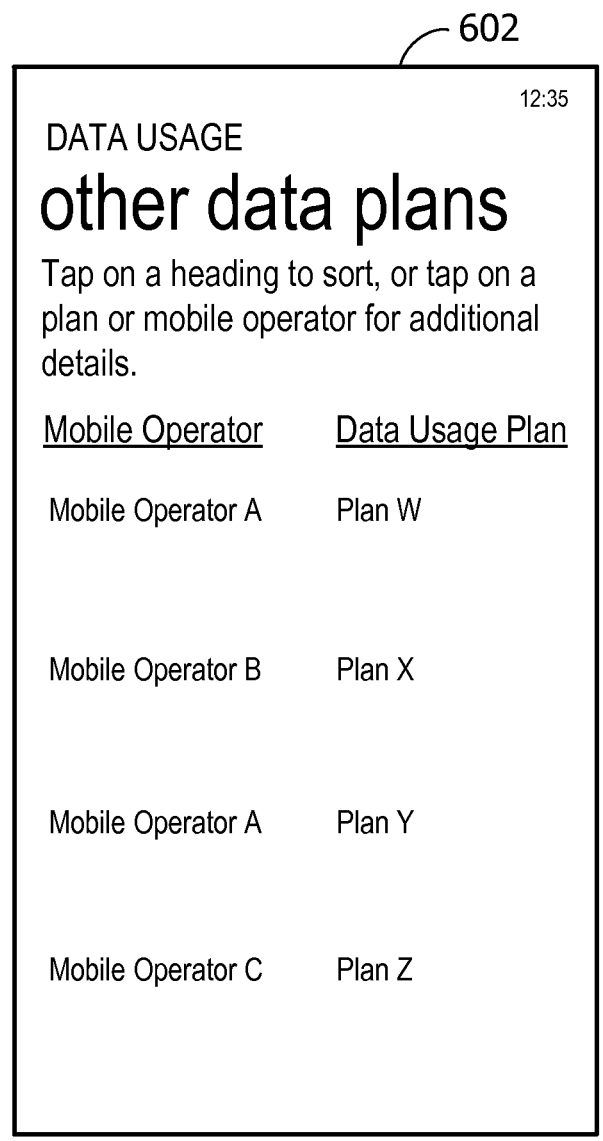
FIG. 6 is an exemplary user interface illustrating recommendations for alternative data usage plans to reduce network transfer costs for the user.

Referring next to FIG. 6, an exemplary user interface 602 illustrates recommendations 122 for alternative data usage plans 116 to reduce network transfer costs for the user 104. In the example of FIG. 6, the user interface 602 identifies the name of the mobile operator 111 for each data usage plan 116. However, other data may be provided to the user 104, such as the cost of each data usage plan 116 (e.g., monthly charge) and/or the expected financial cost savings (e.g., in dollars) for each data usage plan 116 if the user 104 switches to that data usage plan 116.

In FIG. 6, the user interface 602 displays the data usage plans 116 in decreasing order of anticipated cost savings. For example, Mobile Operator A/Plan W is listed first, followed by Mobile Operator B/Plan X, Mobile Operator A/Plan Y, and Mobile Operator C/Plan Z.

Additional Examples

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for profiling data usage for the users 104 based to assign the application data usage profiles 121 to the installed applications 114, and exemplary means for defining recommendations 122 for reducing data usage for the installed applications 114 based on the application data usage profiles 121.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
determining a plurality of applications installed on a computing device;
identifying data usage patterns associated with one or more of the determined plurality of applications, the data usage patterns simultaneously displaying data usage over at least one or more cellular networks and one or more Wi-Fi networks, the simultaneous displaying comprising displaying the data usage by the one or more of the determined plurality of applications over the one or more cellular networks and the one or more Wi-Fi networks in a single display;
predicting future data usage by the one or more of the determined plurality of applications by comparing identified data usage patterns with one or more predefined application data usage profiles;
ranking the determined plurality of applications based on the predicted future data usage; and
defining one or more recommendations for the one or more of the determined plurality of applications to reduce data usage based on the one or more predefined application data usage profiles and the ranking, the one or more recommendations including recommending a reduction of data usage of at least one of the one or more cellular networks or the one or more Wi-Fi networks.

2. The method of claim 1, wherein comparing the identified data usage patterns with the one or more predefined application data usage profiles comprises identifying a data usage profile of the one or more predefined application data usage profiles based on an application identifier associated with an application of the one or more of the determined plurality of applications.

3. The method of claim 1, wherein identifying the data usage patterns comprises assigning a predefined application data usage profile to the one or more of the determined plurality of applications, by selecting the predefined application data usage profile from the predefined one or more application data usage profiles after the comparison.

4. The method of claim 1, wherein the one or more predefined application data usage profiles include application identifiers associated with the one or more predefined data usage profiles, the one or more predefined application data usage profiles assigned to the determined plurality of applications by matching the application identifiers to application identifiers associated with the one or more of the determined plurality of applications.

5. The method of claim 1, wherein defining the one or more recommendations comprises suggesting at least one mobile operator other than a current mobile operator.

6. The method of claim 1, wherein identifying the data usage patterns comprises inferring the data usage patterns based on data usage statistics associated with the one or more of the determined plurality of applications, wherein at least one of the one or more of the determined plurality of applications is executed on a device other than the computing device.

7. The method of claim 1, wherein comparing the identified data usage patterns with the one or more predefined application data usage profiles comprises matching the data usage patterns of the determined plurality of applications with the one or more predefined application data usage profiles based on a type of the one or more of the determined plurality of applications.

8. The method of claim 1, wherein defining the one or more recommendations comprises suggesting at least one alternative service for data communication, the suggested alternative service matching at least one of the one or more predefined application data usage profiles.

9. A system comprising:
a memory and a processor associated with a computing device, wherein the processor is programmed to:
determine a plurality of applications installed on the computing device;
identify a first data usage statistics associated with the determined plurality of applications, the identified first data usage statistics simultaneously displaying data usage over at least one or more cellular networks and one or more Wi-Fi networks by the determined plurality of applications, the simultaneous displaying comprising displaying the data usage by the determined plurality of applications over the one or more cellular networks and the one or more Wi-Fi networks in a single display;
compare the identified first data usage statistics of the determined plurality of applications with a second data usage statistics associated with one or more predefined application data usage profiles;
predict future data usage by the determined plurality of applications based on the comparison;
rank the determined plurality of applications based on the predicted future data usage; and
define one or more recommendations for one or more of the determined plurality of applications to reduce data usage based on the ranking of the determined plurality of applications, the one or more recommendations including recommending a reduction of data usage of at least one of the one or more cellular networks or the one or more Wi-Fi networks.

10. The system of claim 9, wherein the processor is programmed to define the one or more recommendations by recommending uninstallation of at least one of the determined plurality of applications upon predicting that the future data usage will exceed threshold values associated with a data usage plan.

11. The system of claim 9, wherein the processor is programmed to define the one or more recommendations by recommending exchanging a first one of the determined plurality of applications for a second, different application.

12. The system of claim 9, wherein the processor is programmed to define the one or more recommendations by recommending at least one mobile operator other than a current mobile operator.

13. The system of claim 9, wherein the processor is programmed to identify data usage patterns by comparing the identified data usage statistics with data usage statistics associated with the one or more predefined application data usage profiles.

14. The system of claim 13, wherein the processor is programmed to identify the data usage patterns by inferring the data usage patterns based on the data usage statistics associated with the determined plurality of applications.

15. The system of claim 9, wherein defining the one or more recommendations comprises suggesting at least one alternative service for data communication, the suggested alternative service matching at least one of the one or more predefined application data usage profiles.

16. The system of claim 9, wherein the processor is further programmed to assign the one or more predefined application data usage profiles to the determined plurality of applications, by selecting at least one application data usage profile from the one or more predefined application data usage profiles after the comparison.

17. One or more computer storage media having computer-executable instructions, which on execution by at least a processor perform operations, comprising:
determining a plurality of applications installed on a computing device;
identifying data usage patterns associated with the determined plurality of applications, the data usage patterns simultaneously displaying data usage over at least one or more cellular networks and one or more Wi-Fi networks, the simultaneous displaying comprising displaying the data usage by the determined plurality of applications over the one or more cellular networks and the one or more Wi-Fi networks in a single display;
ranking the determined plurality of applications based on the identified data usage patterns; and
defining one or more recommendations for one or more of the determined plurality of applications to reduce data usage based on one or more rules, the one or more rules being based on the identified data usage patterns associated with the ranked plurality of applications, the one or more recommendations including recommending a reduction of data usage of at least one of the one or more cellular networks or the one or more Wi-Fi networks.

18. The computer storage media of claim 17, wherein the computer-executable instructions, executed by the at least a processor perform further operations comprising predicting the future data usage that includes anticipating that data usage over a time interval will exceed a threshold value.

19. The computer storage media of claim 18, wherein predicting the future data usage further comprises:
  obtaining information describing at least one data usage plan competing with a current data usage plan of a user of the computing device; and
  presenting the obtained information to the user for review and selection.

20. The computer storage media of claim 17, wherein ranking comprises ranking the determined plurality of applications from lowest data usage to highest data usage.

* * * * *